United States Patent
Singh et al.

(10) Patent No.: US 8,208,392 B2
(45) Date of Patent: Jun. 26, 2012

(54) SYSTEM AND METHOD FOR PEER-TO-PEER BEAM DISCOVERY AND COMMUNICATION IN INFRASTRUCTURE BASED WIRELESS NETWORKS USING DIRECTIONAL ANTENNAS

(75) Inventors: Harkirat Singh, Santa Clara, CA (US); Xiangping Qin, San Jose, CA (US); Huai-Rong Shao, Santa Clara, CA (US); Chiu Ngo, San Fransico, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 981 days.

(21) Appl. No.: 12/188,158

(22) Filed: Aug. 7, 2008

(65) Prior Publication Data
US 2009/0046653 A1     Feb. 19, 2009

Related U.S. Application Data

(60) Provisional application No. 60/955,617, filed on Aug. 13, 2007.

(51) Int. Cl.
*G01R 31/08* (2006.01)
(52) U.S. Cl. ........ 370/252; 370/254; 370/329; 370/330; 370/347; 370/466; 455/39; 455/63.4; 455/127.5; 455/422.1
(58) Field of Classification Search .......... 370/254, 370/329, 330, 335, 336, 338, 347, 350, 466; 455/39, 63.4, 127.5, 422.1
See application file for complete search history.

(56) References Cited

U.S. PATENT DOCUMENTS

| | | | | |
|---|---|---|---|---|
| 5,596,333 | A * | 1/1997 | Bruckert | 342/457 |
| 5,924,020 | A | 7/1999 | Forssen et al. | |
| 6,414,955 | B1 * | 7/2002 | Clare et al. | 370/390 |
| 6,954,449 | B2 * | 10/2005 | Cain et al. | 370/337 |
| 6,985,498 | B2 * | 1/2006 | Laroia et al. | 370/478 |
| 7,085,541 | B2 * | 8/2006 | Redi et al. | 455/69 |
| 7,304,972 | B2 * | 12/2007 | Cain et al. | 370/338 |
| 7,333,458 | B2 * | 2/2008 | Cain | 370/337 |
| 7,453,832 | B2 * | 11/2008 | Steer et al. | 370/278 |
| 7,489,650 | B2 | 2/2009 | Ginzburg et al. | |
| 7,515,577 | B2 * | 4/2009 | Pandey et al. | 370/338 |
| 7,551,135 | B2 | 6/2009 | Uno et al. | |
| 7,664,054 | B2 * | 2/2010 | Adya et al. | 370/255 |
| 7,729,321 | B2 | 6/2010 | Liu | |

(Continued)

OTHER PUBLICATIONS

IEEE 802.15-07-0761-00-003c: Unified and flexible millimeter wave WPAN systems supported by common mode, Jul. 2007.

(Continued)

*Primary Examiner* — Ayaz Sheikh
*Assistant Examiner* — Andrew C Lee
(74) *Attorney, Agent, or Firm* — Kenneth L. Sherman, Esq.; Michael Zarrabian, Esq.; Sherman & Zarrabian LLP (57) ABSTRACT

A system and method for performing a beam discovery between peer stations is disclosed. A channel time message indicating an allocation of a first time period for a peer-to-peer beam discovery (PBD) is received, where the PBD is configured to discover a beam direction to be used for data transfer to a peer station. The PBD is executed between two peer stations during the first time period. Data is transferred to the peer station via the discovered beam direction if the PBD is successful.

36 Claims, 11 Drawing Sheets

U.S. PATENT DOCUMENTS

| | | | |
|---|---|---|---|
| 7,783,258 B2* | 8/2010 | Bevan et al. | 455/63.1 |
| 7,826,431 B2 | 11/2010 | Cave et al. | |
| 2002/0044549 A1* | 4/2002 | Johansson et al. | 370/386 |
| 2002/0183095 A1 | 12/2002 | Aoyama et al. | |
| 2004/0002363 A1* | 1/2004 | Cuffaro | 455/562.1 |
| 2004/0032847 A1* | 2/2004 | Cain | 370/338 |
| 2004/0105412 A1 | 6/2004 | He et al. | |
| 2004/0141511 A1* | 7/2004 | Rune et al. | 370/401 |
| 2005/0097409 A1 | 5/2005 | Shin et al. | |
| 2006/0050728 A1 | 3/2006 | Sung et al. | |
| 2006/0067280 A1 | 3/2006 | Howard et al. | |
| 2006/0227740 A1* | 10/2006 | McLaughlin et al. | 370/329 |
| 2006/0227750 A1* | 10/2006 | Soltanian et al. | 370/335 |
| 2006/0240780 A1* | 10/2006 | Zhu et al. | 455/63.4 |
| 2006/0268800 A1 | 11/2006 | Sugaya et al. | |
| 2007/0087758 A1* | 4/2007 | Norris et al. | 455/456.1 |
| 2007/0115817 A1 | 5/2007 | Gupta et al. | |
| 2007/0287384 A1 | 12/2007 | Sadri et al. | |
| 2007/0297365 A1* | 12/2007 | Li et al. | 370/331 |
| 2008/0026797 A1* | 1/2008 | Nanda et al. | 455/562.1 |
| 2008/0112375 A1 | 5/2008 | Bennett | |
| 2009/0016285 A1* | 1/2009 | Li et al. | 370/329 |
| 2009/0052389 A1 | 2/2009 | Qin et al. | |
| 2009/0109938 A1 | 4/2009 | Singh et al. | |
| 2009/0125792 A1 | 5/2009 | Lakkis | |
| 2009/0323611 A1 | 12/2009 | Singh et al. | |
| 2010/0014489 A1 | 1/2010 | Qin et al. | |
| 2010/0091919 A1 | 4/2010 | Xu et al. | |
| 2010/0110981 A1 | 5/2010 | Shao et al. | |
| 2010/0111006 A1* | 5/2010 | Zhai et al. | 370/329 |
| 2010/0118835 A1 | 5/2010 | Lakkis et al. | |
| 2010/0142445 A1* | 6/2010 | Schlicht et al. | 370/328 |
| 2010/0142460 A1* | 6/2010 | Zhai et al. | 370/329 |
| 2010/0172296 A1 | 7/2010 | Singh et al. | |
| 2010/0177719 A1 | 7/2010 | Shao et al. | |
| 2011/0064072 A1 | 3/2011 | Wang et al. | |

OTHER PUBLICATIONS

IEEE 805.15.3 MAC: Wireless Medium Access Control (MAC) and Physical Layer (PHY) Specifications for High Rate Wireless Personal Area Networks (WPANs), Sep. 29, 2003.

Lakkis et al., TG3c Call for Proposals, IEEE P802.15 Working Group for Wireless Personal Area Networks (WPANs), Doc. # 15-08-0355-00-003c, May 14, 2008, Chapter 2 Superframe Structure, pp. 37-43.

International Search Report dated Jan. 9, 2009 in Application No. PCT/KR2008/004793, filed Aug. 19, 2008.

International Preliminary Report on Patentability and Written Opinion dated Feb. 24, 2010 in Application No. PCT/KR2008/004793, filed Aug. 19, 2008.

IEEE Computer Society, "IEEE P802.15.3c/D02 Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension", IEEE, 2008, pp. i-192, New York, United States.

Harada, H. et al., "Unified and Flexible Millimeter Wave WPAN Systems Supported by Common Mode (IEEE 802.15-07-0761-00-003c)", IEEE, Jul. 9, 2007, pp. 1-46, United States.

IEEE, "IEEE Wireless LAN Edition, A Compilation Based on IEEE Std 802.11 ™-1999 (R2003) and Its Amendments", IEEE, 2003, pp. i-678, New York, United States.

U.S. Non-final Office Action for U.S. Appl. No. 12/188,534, mailed Oct. 19, 2011.

Harada, H. et al., "Unified and Flexible Millimeter Wave WPAN Systems Supported by Common Mode (IEEE 802.15-07-0761-10-003c)", Sep. 18, 2007, pp. 1-62, IEEE, United States.

Sadri, A.S. et al., "60 GHz WPAN Framework and Gaps of merged proposals (IEEE 802.15-924)", Nov. 14, 2007, pp. 1-19, IEEE, United States.

Harada, H. et al., "Merged Proposal: New PHY Layer Enhancement of MAC for mmWave System Proposal (IEEE 802.15-07-0934-01-003c)", Nov. 13, 2007, pp. 1-89, IEEE, United States.

U.S. Non-Final Office Action for U.S. Appl. No. 12/541,096 mailed Feb. 24, 2012.

U.S. Non-Final Office Action for U.S. Appl. No. 12/628,792 mailed Feb. 24, 2012.

\* cited by examiner

FIG. 10

SYSTEM AND METHOD FOR PEER-TO-PEER BEAM DISCOVERY AND COMMUNICATION IN INFRASTRUCTURE BASED WIRELESS NETWORKS USING DIRECTIONAL ANTENNAS

This application claims priority from U.S. Provisional Patent Application No. 60/955,617, filed on Aug. 13, 2007, which is incorporated herein by reference.

BACKGROUND OF THE INVENTION

1. Field of the Invention

The present invention relates to wireless transmission in a wireless network, and in particular, to an antenna sector discovery between peer stations using directional antennas in a wireless network.

2. Description of the Related Technology

Beam discovery (e.g., sector discovery) is the first step before exchanging data using directional antennas (or antenna arrays). A proposed amendment to IEEE 802.15.3 standard for Millimeter-wave based PHY layer specifies an Automatic Device Discovery (ADD) scheme for devices using directional antennas. The proposed ADD scheme assists in discovering the directional antenna that is used at a piconet controller (PNC) to directionally communicate with a station and vice versa. The ADD scheme suffers from the shortcoming that it does not assist in device-to-device (peer-to-peer) antenna discovery, e.g., which antennas should be used for data exchange between two stations when neither of them is a PNC.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly.

In one embodiment, there is a method of performing a beam discovery between peer stations in a wireless network, the method comprising receiving a channel time message indicating an allocation of a first time period for a peer-to-peer beam discovery (PBD), wherein the PBD is configured to discover a beam direction to be used for data transfer to a peer station; executing the PBD between two peer stations during the first time period; and transferring data to the peer station via the discovered beam direction if the PBD is successful.

In another embodiment, there is a method of facilitating a beam discovery between peer stations in a wireless network, the method comprising allocating a first time period for a peer-to-peer beam discovery (PBD), wherein the PBD is configured to discover a beam direction to be used for data transfer between a first station and a second station; transmitting a channel time message indicating an allocation of the first time period to at least one of the first and second stations; and receiving a control message from at least one of the first and second stations indicating success or failure of the PBD.

In yet another embodiment, there is a communication apparatus for performing a beam discovery with a peer station in a wireless network, the apparatus comprising a processor configured to receive a channel time message indicating an allocation of a first time period for a peer-to-peer beam discovery (PBD), wherein the PBD is configured to discover a beam direction to be used for data transfer to a peer station, and execute the PBD during the first time period; and a directional antenna configured to transfer data to the peer station via the beam direction discovered by the PBD.

In yet another embodiment, there is a communication apparatus for facilitating a beam discovery in a wireless network, the apparatus comprising a processor configured to allocate a first time period for a peer-to-peer beam discovery (PBD), wherein the PBD is configured to discover a beam direction to be used for data transfer between a first station and a second station; transmit a channel time message indicating an allocation of a first time period for the PBD to at least one of the first and second stations; and receive a control message from at least one of the first and second stations indicating success or failure of the PBD.

DETAILED DESCRIPTION OF CERTAIN INVENTIVE EMBODIMENTS

Certain embodiments provide a method and system for performing a beam discovery between peer stations in a wireless network. In some embodiments, the throughput of the wireless network is improved by use of a peer-to-peer beam discovery (PBD) scheme protocol to be described below.

The following detailed description is directed to certain sample embodiments of the invention. However, the invention can be embodied in a multitude of different ways as defined and covered by the claims. In this description, reference is made to the drawings wherein like parts are designated with like numerals throughout.

Figure 1:
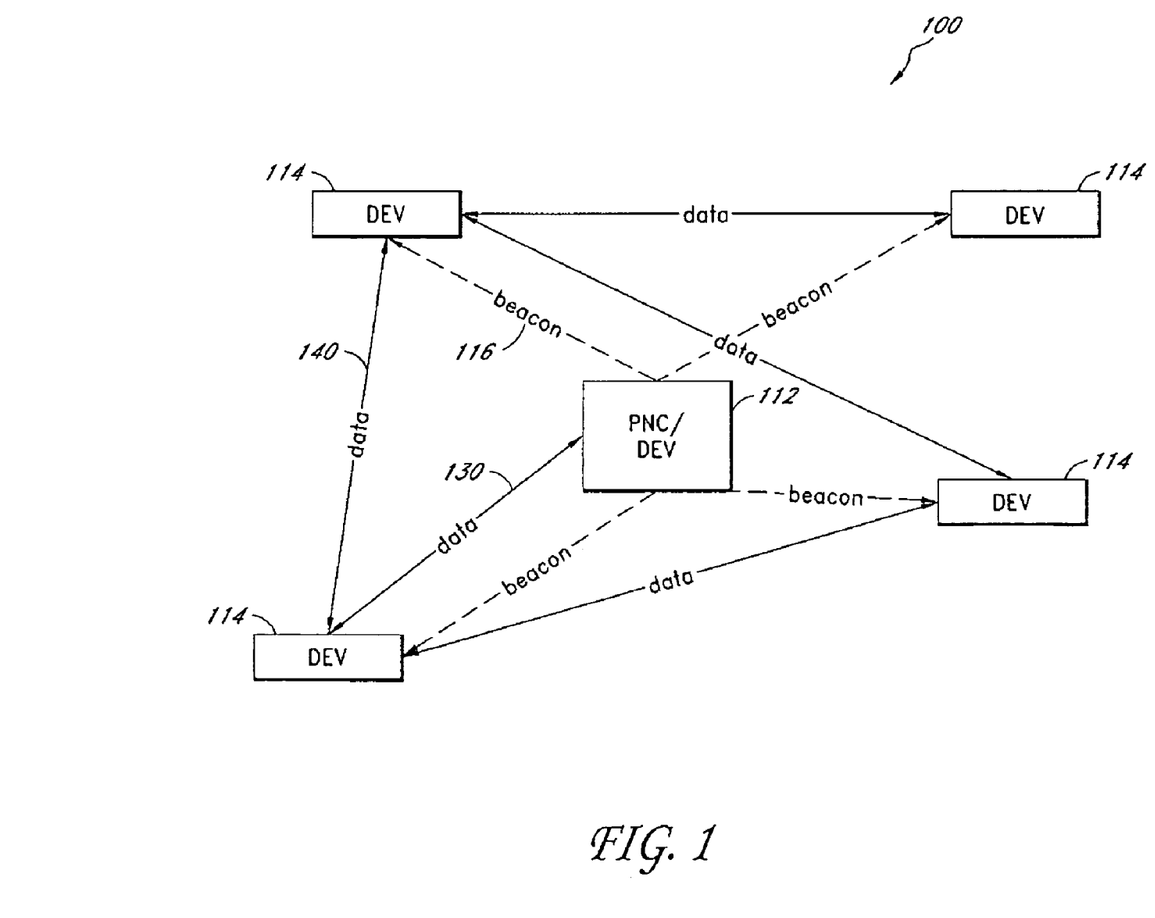
FIG. 1 is a functional block diagram of an exemplary configuration of a wireless network that implements data transmissions between wireless devices according to one embodiment of the system and method.

Exemplary implementations of embodiments in a wireless network will now be described. FIG. 1 shows a functional block diagram of a wireless network 100 that implements data transmission between devices such as a device coordinator and stations, according to certain embodiments. In other embodiments, one or more of the devices can be a computer, such as a personal computer (PC), and mobile devices such as a personal digital assistant (PDA), digital still or video cameras, and mobile phones. In some embodiments, the network is a Wireless Personal Area Network (WPAN). The network 100 includes a device coordinator 112 and multiple client devices or stations 114 (e.g., Device 1 . . . Device N). In embodiments where the wireless network is a WPAN, the device coordinator 112 can be a piconet controller (PNC). In the WPAN, the PNC enables communications between stations by reserving bandwidth or time periods for data transfers between the stations.

Certain embodiments of the wireless network utilize a superframe structure for data transport. In a superframe structure, beacons 116 transmitted by the coordinator 112 act as limits or markers between transmissions in the sense that each transmission begins with a beacon and ends with a next beacon. Beacons provide synchronization as well as configuration information to the stations 114. Within superframes, contention can occur among stations, and such contentions are resolved by Carrier Sense Multiple Access with Collision Avoidance (CSMA/CA), followed by data transmissions 130, 140. As shown in FIG. 1, data transmissions are of two types: 1) coordinator-to-station data streams 130, and 2) peer-to-peer (P2P) data streams 140.

Figure 2:
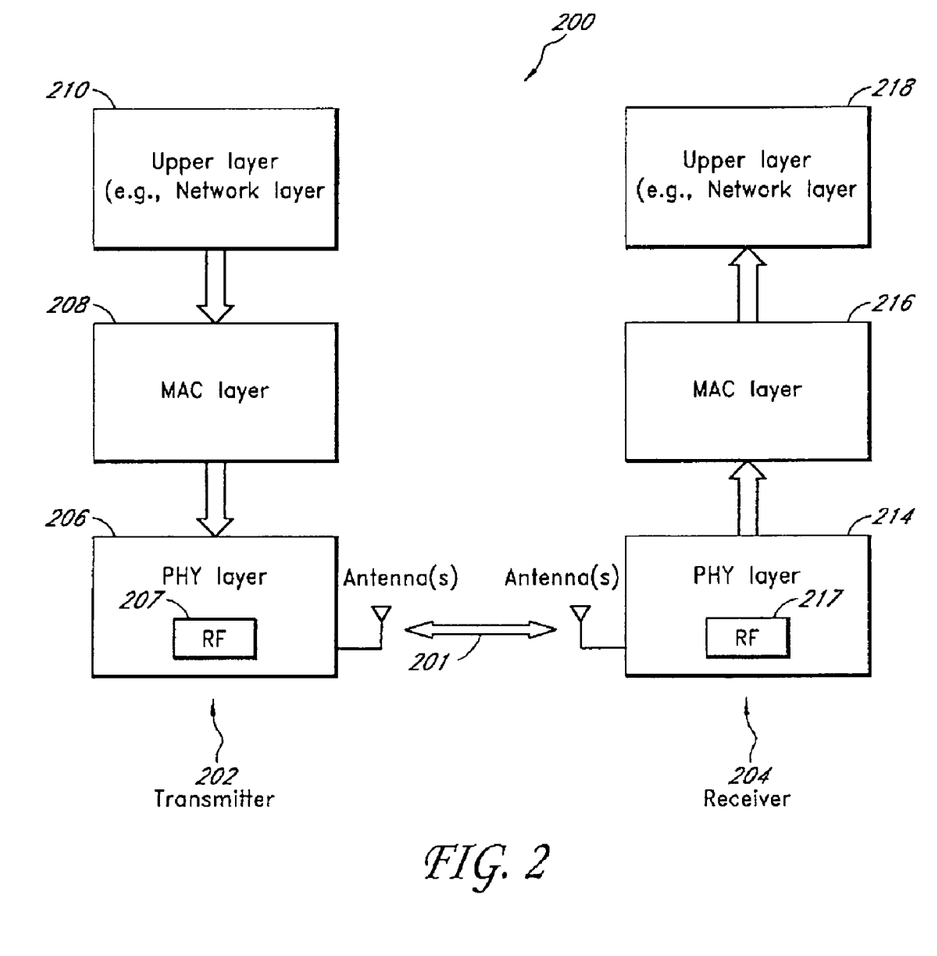
FIG. 2 is a functional block diagram of an example communication system for transmission of data, according to one embodiment of the system and method.

FIG. 2 shows a generalized block diagram illustrating an example wireless network system 200. The example wireless network system 200 includes a transmit station 202 and receive station 204. The transmit station 202 or the receive station 204 can be a device coordinator 112 or a station 114 shown in FIG. 1. In certain embodiments, the wireless network system 200 shown in FIG. 2 represents an IEEE 802.15 stack for a Wireless Personal Area Network (WPAN). In other embodiments, the wireless network 200 represents an IEEE 802.11 stack for Wireless Local Area Network (WLAN). The transmitter 202 includes a physical (PHY) layer 206, a media access control (MAC) layer 208, an upper layer 210, and one or more antennas associated with the PHY layer 206. Similarly, the receiver 204 includes a PHY layer 214, a MAC layer 216, an upper layer 218, and one or more antennas associated with the PHY layer 214. In some embodiments, the PHY layers 206, 214 include radio frequency (RE) modules 207, 217. The PHY layers 206, 214 provide wireless communication between the transmitter 202 and the receiver 204 via the RF modules 207, 217 and the one or more antennas through a wireless medium 201. The MAC layers 208, 216 provides addressing and channel access controls that make it possible for several network nodes to communicate within a multipoint network such as the wireless network 100 shown in FIG. 1.

The upper layers 210, 218 represent one or more layers that are above the MAC layers 208, 216, respectively, and send command and/or data messages to the MAC layers. In certain embodiments (e.g., OSI or TCP/IP models), the upper layer 210, 218 includes a network layer. In certain embodiments, the network layer includes an IP protocol that performs the basic task of getting data packets from source to destination. In other embodiments (e.g., five-layer TCP/IP model), the upper layer 210, 218 further includes a transport layer and an application layer. In other embodiments, (e.g., seven-layer OSI model), the upper layer 210, 218, in addition to the transport layer and the application layer, further includes a session layer and a presentation layer.

In the transmit station 202, the upper layer 210 provides data (e.g., text, graphics, or audio data) and/or command messages to the MAC layer 208. In certain embodiments, the MAC layer 208 can include a packetization module (not shown) which puts the data and/or command messages into the form of one or more data packets. The MAC layer 208 then passes the data packets to the PHY layer 206. The PHY/MAC layers of the transmitter 202 add PHY and MAC headers to the data packets. The PHY layer 206 transmits wireless signals including the data packets to the receiver 204 via the RF module 207 over the wireless channel 201.

In the receive station 204, the PHY layer 214 receives the transmitted wireless signals including the data packets via the RF module 217. The PHY/MAC layers 214, 216 then process the received data packets to extract one or more data/command messages. The extracted data/command messages are passed to the upper layer 210 where the messages are further processed and/or transferred to other modules or devices to be displayed (text or graphics) or played (audio), for example.

The terms "transmit station" and "receive station" are used for illustrative purposes only and are not meant to limit the transmit station 202 and the receive station 204 shown in FIG. 2 as stations that can only transmit and receive data, respectively. It will be appreciated that the transmit station 202 can also receive wireless signals from the receive station 204 or another station 114 or a device coordinator 112 in the wireless network 100 (FIG. 1). Similarly, it will be appreciated that the receive station 204 can also transmit wireless signals to the transmit station 202 or another station 114 or a device coordinator 112. For example, assume that the transmit station 202 is a personal computer (PC) and the receive station 204 is a personal digital assistant (PDA). While the PDA can receive or download data from the PC at certain times, it can also transmit or upload data to the PC at other times. In this sense, the PC and the PDA can switch roles between transmit and receive stations.

In certain embodiments, the transmit station 202 and the receive station 204 can include directional antennas via which they transmit and receive wireless signals. The directional antennas can include antennas comprising multiple sectors or elements including a switched (sectored) antenna and a phased array antenna. The directional antenna can also include a single-element directional antenna. Before a pair of stations with directional antennas engages in data communication, the pair typically performs an antenna training or beamforming in order to improve a signal-to-noise ratio (SNR).

Overview of Peer-to-Peer Beam Discovery (PBD) Procedure

Figure 3:
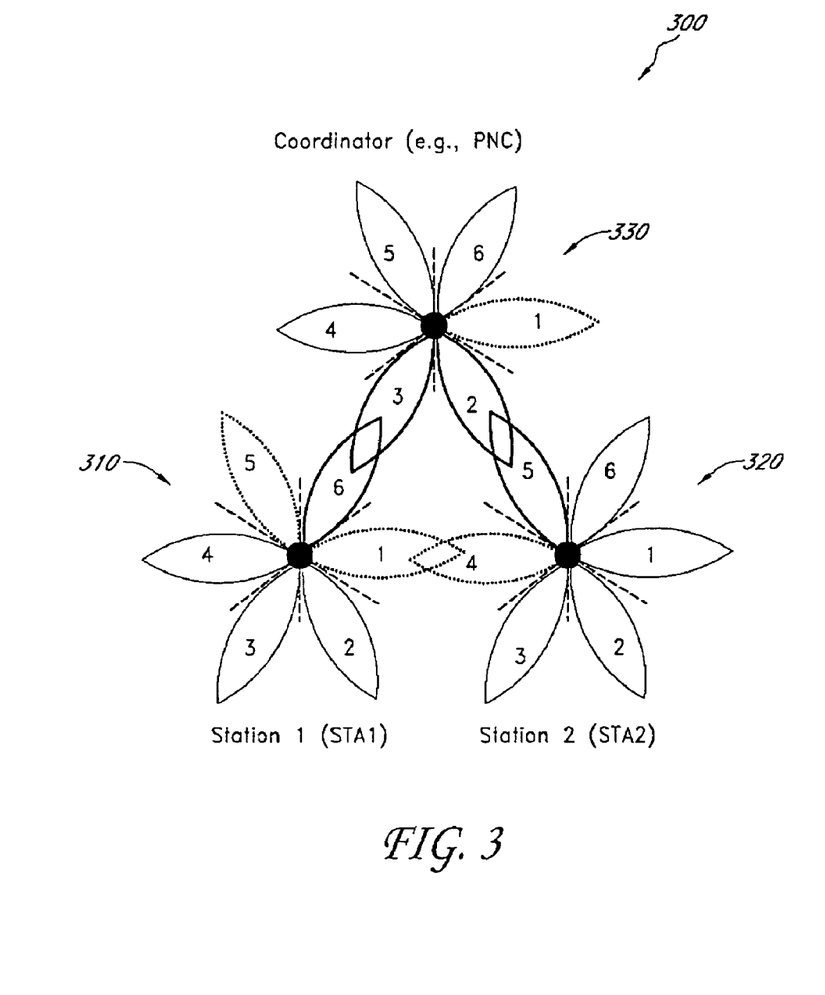
FIG. 3 is a schematic diagram illustrating beam discoveries that can occur in an example wireless network comprising a coordinator and two stations.

FIG. 3 is a schematic diagram illustrating beam discoveries that can occur in an example wireless network 300 comprising a coordinator and two peer stations. In this example, the wireless network 300 is a Wireless Personal Area Network (WPAN), and the coordinator is a piconet controller (PNC) 330. PNC 330 and two peer stations—Station 1 (STA1) 310 and Station 2 (STA2) 320—that are associated with PNC 330 all have sectored antennas, each with six antenna sectors, in this example. As shown, after a proper beam discovery, STA1 310 would know that it can reach PNC 330 via its antenna sector 6, and PNC 330 would know that it can reach STA1 via its antenna sector 3. Similarly, after a proper beam discovery, STA2 320 would know that it can reach PNC 330 via its antenna sector 5, and PNC 330 would know that it can reach STA2 320 via its antenna sector 2. Such a beam discovery involving a coordinator and a station is supported by the Automatic Device Discovery (ADD) protocol included in the current proposal to IEEE standard 802.15.3c. The proposal including the ADD protocol is described in "Unified and flexible millimeter wave WPAN systems supported by common mode", IEEE 802.15-07-0761-00-003c, July 2007, which is incorporated herein by reference in its entirety.

The proposed ADD protocol, however, does not support a beam discovery between two peer stations. Allowing a beam discovery between two peer stations can add to the throughput of the wireless network by allowing direct data transmissions between the peer stations without requiring PNC to act as a relay station for the data transmissions. The system and method disclosed herein enables peer-to-peer beam discovery (PBD) between two peer stations such as STAT 310 and STA2 320 shown in FIG. 3. As used herein, the beam discovery refers to a procedure by which one or more beam directions, directions along which data transmissions will take place, are discovered. For switched or sectored antennas comprising multiple antenna sectors, the beam discovery can involve finding one or more antenna sectors that yield acceptable SNRs that are equal to or greater than a threshold limit. For a phase array antenna comprising multiple antenna elements, the beam discovery involves finding one or more beamforming vectors or coefficients that yield acceptable SNRs that are equal to or greater than a threshold limit. In both cases, the beam discovery can also involve finding a beam direction, e.g., antenna sector or beamforming vector, that yields the highest SNR among the acceptable SNRs. For a single-element directional antenna, the beam discovery involves finding a direction towards which the antenna would have to face to achieve an acceptable SNR. After the PBD, the STA1 310 knows that it can reach STA2 320 via its antenna sector 1 and STA2 knows that it can reach STA1 via its antenna sector 4.

Figure 4A:
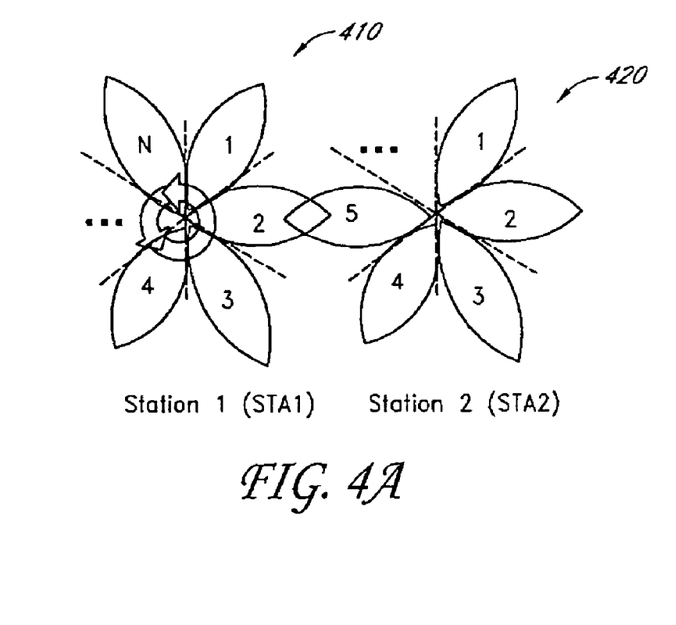
FIGS. 4a and 4b are schematic diagrams illustrating peer-to-peer beam discovery (PBD) procedures between two stations.
Figure 4B:
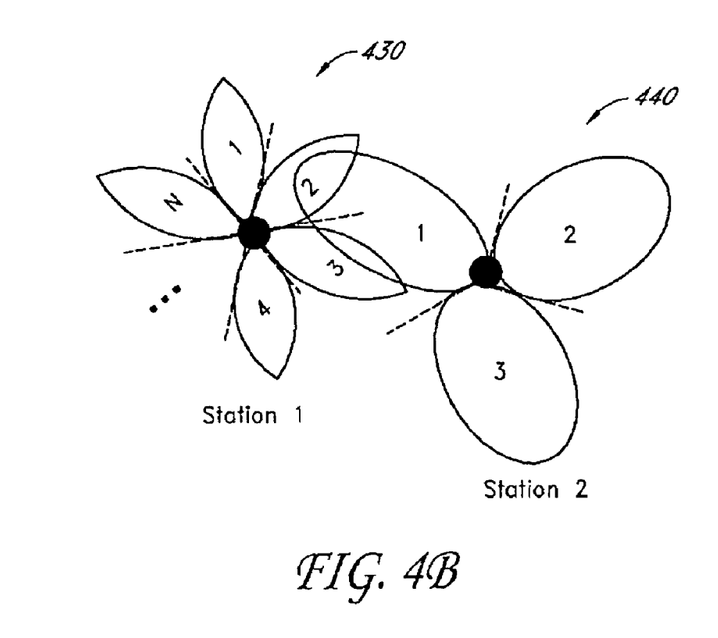

FIGS. 4a and 4b are schematic diagrams illustrating the peer-to-peer beam discovery (PBD) procedures. In both cases, two peer stations, STA1 and STA2, want to communicate with each other; however, these stations do not know which antenna sectors (or beams) to use. A PBD is required for this purpose. In the example case shown in FIG. 4a, Station 1 (STA1) 410 and Station 2 (STA2) 420 and their sectored antennas are oriented in such a way that STA1 410 needs to use antenna sector (or beam) 2 and STA2 needs to use antenna sector (or beam) 5 to successfully communicate with each other. Any other combination of antenna sectors would not work. However, beam discovery becomes more challenging in FIG. 4b, because there it is possible that more than one beam at one station can cover the peer station. For example, STA1 430 can reach STA2 440 by either antenna sector 2 or 3. In such situations, the best beam, e.g., sector 3, is selected for robust peer-to-peer (P2P) data communication or transfer. While the FIGS. 4a and 4b show stations with sectored antennas, it will be understood by one skilled in the art that one or both of the sectored antennas can be replaced with a phase antenna array without departing from the system and method disclosed herein. With the phase antenna array, the beam discovery involves discovering appropriate beamforming vectors and their associated beamforming coefficients rather than discovering antenna sectors.

Figure 4C:
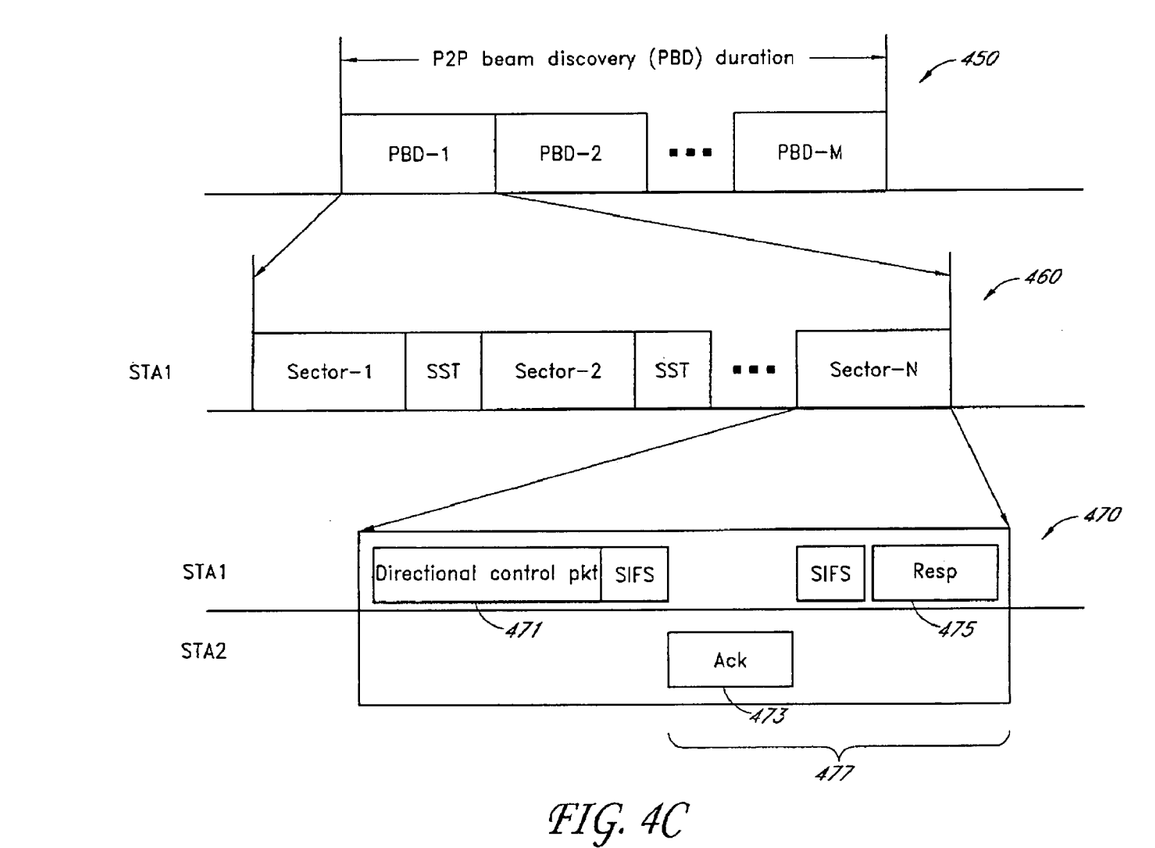
FIG. 4c shows a series of schematic diagrams 450, 460, 470 for illustrating example peer-to-peer beam discovery (PBD) sequences between a transmitter (STA1) and a receiver (STA2).

FIG. 4c shows a series of schematic diagrams 450, 460, 470 for illustrating example PBD sequences between a transmitter (STA1) and a receiver (STA2). The first diagram 450 represents an entire PBD procedure comprising a plurality of PBD sequences or blocks. The second diagram 460 illustrates various components of a PBD sequence including a plurality of directional control messages. The third diagram 470 illustrates various components of a directional control message. Assume for the purpose of the following discussion that transmit and receive antennas at the STA1 and STA2 are switched (sectored) antennas such as the ones shown in FIGS. 4a and 4b. In alternative embodiments, one or both of the transmit and receive antennas can be phased array antennas. Also assume that the transmit antenna has N antenna sectors $(AST_1, \ldots, AST_K, \ldots AST_N)$, and the receive antenna has M antenna sectors $(ASR_1, \ldots, ASR_K, \ldots ASR_M)$.

At the start of a $K^{th}$ PBD sequence $(PBD_K)$, the STA2, a receiver, listens on its antenna sector $ASR_K$ for the entire duration of the $PBD_K$. During the $PBD_K$, the transmitter (STA1), transmits a directional control message on each of its N antenna sectors. Therefore, as the second diagram 460 illustrates, each PBD sequence includes a chain N directional control messages for the N antenna sectors separated by N-1 sector switch times (SSTs), where the SST is the time spent in switching from one sector to another sector. As the third diagram 470 illustrates, after transmitting a directional control message or packet 471 on an antenna sector, the STA1 waits for an acknowledgment (Ack) message from the STA2, where the Ack message 473 indicates that the STA2 can hear on that sector. The STA1 replies with an Ack response message 473. Accordingly, each directional control message transmission 471 is followed by an Ack/Resp duration 477 to accommodate for the Ack message 473 and the response control message 475. The Ack and response messages indicate that the transmitter and the receiver (STA1 and STA2) have discovered each other. At the start of the next PBD, e.g., $K+1^{th}$ PBD $(PBK_{K+1})$, the receiver (STA2) listens on an antenna sector $ASR_{K+1}$. The transmitter (STA1) repeats the same steps that it performed in the $PBK_K$ described above.

As discussed above with respect to FIG. 4b, it is possible that the receiver can reach the transmitter on more than one antenna sectors, in which case the P2P devices can choose the best antenna pair based on signal-to-noise ratio (SNR) or other metrics. For example, after completing all M PBD sequences, the P2P devices can select the best antenna pair for the robust transmission based on estimated SNR values. In the example of FIG. 4b, the transmitter can receive Ack messages from the receiver on more than one antenna sectors (2 and 3). During the PBD sequences, one or both of the P2P devices can estimate SNR values for the directional transmissions and store the estimated SNR values. Once all N×M antenna pairs have been tested for the best SNR by completing all M PBD sequences, the P2P device can select the antenna pair that yields the highest SNR value.

Peer-to-Peer Beam Discovery (PBD) Reservation

To reserve bandwidth for P2P data transfer, a transmit station that seeks to establish communication with a destination receive station would initiate a bandwidth reservation by sending a channel time request (CTR) command to the PNC. Such a CTR command is supported by the IEEE 802.15.3 MAC. The CTR command has a Channel Time Request Block (CTRqB) field which has a sub field "Target ID List". The Target ID List sub field is a series of DEVIDs with which the transmit station wishes to establish communications. Upon noticing that the address of the destination (receive) station (indicated in the Target ID list sub field) is not the PNC, the PNC makes a determination as to whether a P2P beam discovery (PBD) has ever taken place between the transmit and receive stations, and if it has, whether the PBD information is still valid. In certain embodiments, the PNC makes this determination as to the validity of the PBD between two nodes i and j (e.g., STA1 and STA2) by maintaining an N×N matrix in a memory, where N is the number of stations including the PNC in the network. A non-diagonal entry of the N×N matrix can include a PBD status value, e.g., True or False, depending on the validity of the PBD between the two nodes i and j. A diagonal entry of the N×N matrix is set to a unique value which is different from the PBD status value (e.g., True/False) indicating that the diagonal entry is invalid and can be ignored since the matrix holds beam discovery status with peers. It is possible that a station can explicitly request a channel time allocation for PBD from the PNC. If the PNC determines that there is no valid PBD information between the stations, it facilitates the PBD by making a determination as to whether the requested bandwidth is available for the PBD procedure. In IEEE 802.15.3, for example, if the requested bandwidth is available and the PBD between the peer stations is valid, the PNC replies with a channel time response command having the reason code field set to Success, On the other hand, if the PBD is not valid at the time the channel is requested, the PNC can set the reason code field set to PBD required. Two different bandwidth reservation options for the PNC are described below in the context of the IEEE 802.15.3c standard. However, it will be appreciated that the system and method described herein are applicable to other WPAN or WLAN standards.

a. Two-Step Bandwidth Allocation

In the first option or embodiment of the PBD, the PNC allocates a reservation, e.g., time periods, for PBD and data transfer in two separate steps. The time periods for the PBD and the actual data transfer occur during contention free periods.

Figure 5:
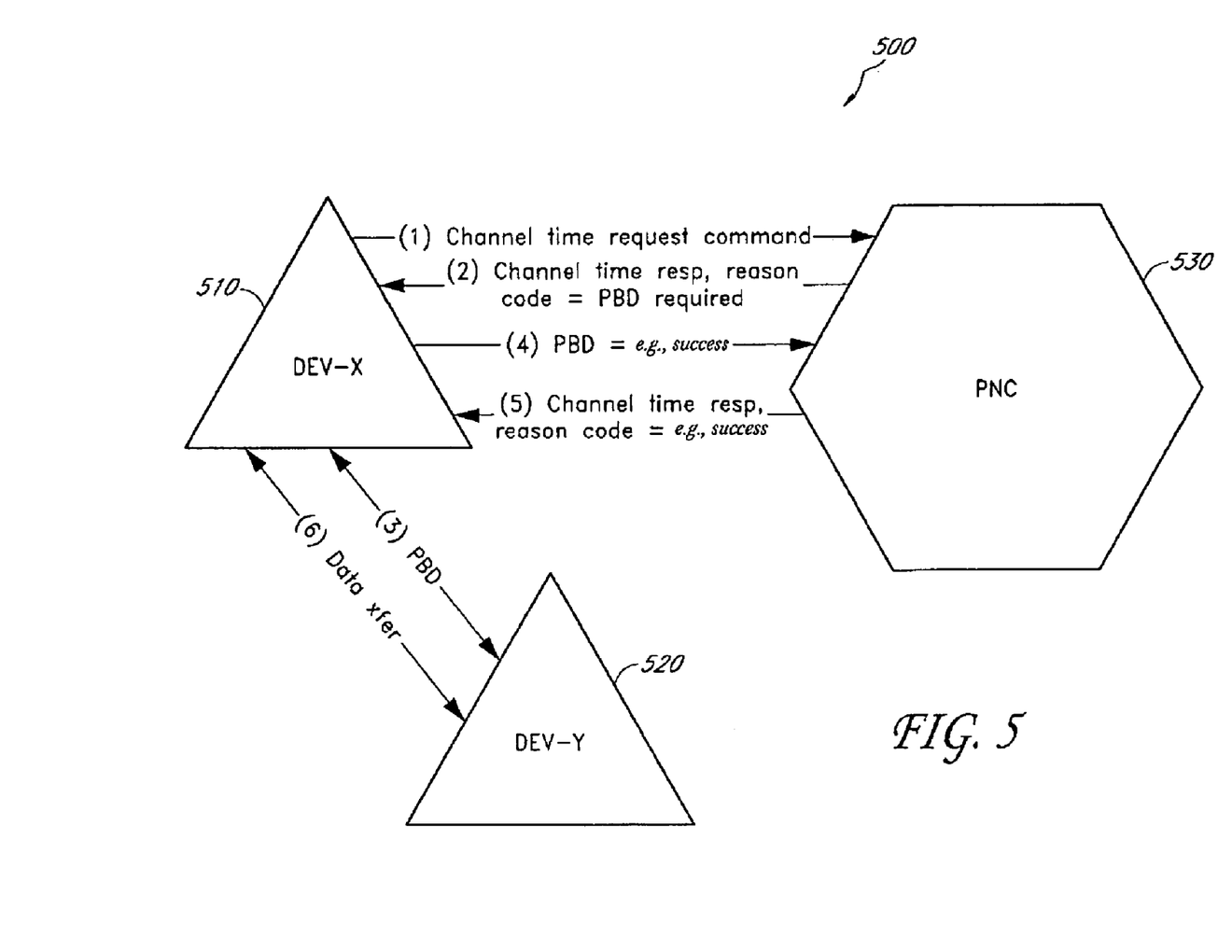
FIG. 5 is a message sequence chart for illustrating an embodiment of a PBD procedure in which a coordinator (e.g., a piconet controller) allocates bandwidth for PBD and data transfer in two separate steps

FIG. 5 is a message sequence chart for illustrating an embodiment of a PBD procedure in which a coordinator (e.g., PNC) allocates bandwidth for PBD and data transfer in two separate steps. The message sequence begins when a first station (STA1) 510, e.g., a transmit station, sends or transmits a channel time request (CTR) command (1) to the PNC 530. The CTR command (1) indicates to the PNC 530 that the STA1 510 wishes to engage in data transfer with a second station (STA2) 520, e.g., a receiver or destination station. The CTR command (1) can include a request for allocation of bandwidth, e.g., one or more time periods, for executing the PBD. Upon receiving the CTR command (1), the PNC 530 sends a first channel time response (2) to the STA1 510. As noted above, the first channel time response (2) can include a reason code set to "PBD required." Before sending the channel time response (2), the PNC 530 reserves or allocates a first time period for executing the PBD, and the channel time response (2) can includes one or more channel time allocation periods (CTAPs) including the first time period. In IEEE 802.15.3 one CTAP is divided into multiple channel time allocation (CTA) slots. As used herein, the term "CTAP" refers to CTA slots, which can be contention free period allocated by the PNC. In some embodiments, the PNC knows the antenna configurations of the P2P stations, such as the number of antenna sectors at the P2P stations, and the channel on which the P2P stations will execute beam discovery. In those embodiments, the PNC can estimate the time required for the PBD procedure. In other embodiments, the PNC can allocate a nominal time period for PBD, and the P2P stations can request additional period for PBD if so required.

After receiving the channel time response message (2), the STA1 510 executes PBD by exchanging PBD messages (3) with the STA2 520. The PBD messages (3) are exchanged during the first time period allocated for the PBD procedure by the PNC and communicated to the STA1 via the channel time response message (2). Through the exchange of the PBD messages, the P2P stations (STAT and STA2) can discover a beam direction by, for example, finding a combination of antenna sectors that achieves a sufficiently high or highest SNR, to use for subsequent data transfer. In certain embodiments, the STA1 510, the transmit station initiating the channel allocation (e.g., by sending the CTR command to the PNC), is the sender of the PBD messages. In other embodiments, the STA2 520, the receive station, is the sender of the PBD messages (3). The PBD messages (3) can be probes, announce commands, beam searching messages, and the like. After the exchange of the PBD messages (3), the STA1 510 sends a control message (4) to the PNC. The control message (4) indicates success or failure of the PBD procedure. In this example, the success means the P2P stations were able to discover a pair of antenna sectors that could achieve an acceptable signal-to-noise ratio (SNR) that meets a certain predetermined threshold SNR value. The failure, on the other hand, means the P2P stations, for various reasons, were unable to find a pair of antenna sectors that could achieve an acceptable SNR that meets a certain predetermined threshold value. In the example shown, the control message (4) indicting the success or failure of the PBD is sent by the STA1 510, the transmit station. In other embodiments, the control message (4) can be sent by the STA2 520, the receive station.

If the PBD was successful, the PNC allocates the requested bandwidth for data transfer and sends a second channel time message (5) to the STA1 510, indicating allocation of a second time period comprising one or more CTAPs for data transfer. The second channel time response (5) can include a reason code set to "success". During the second time periods, the P2P stations 510, 520 engage in data transfer (6) via the antenna sectors discovered during the PBD procedure.

Figure 6:
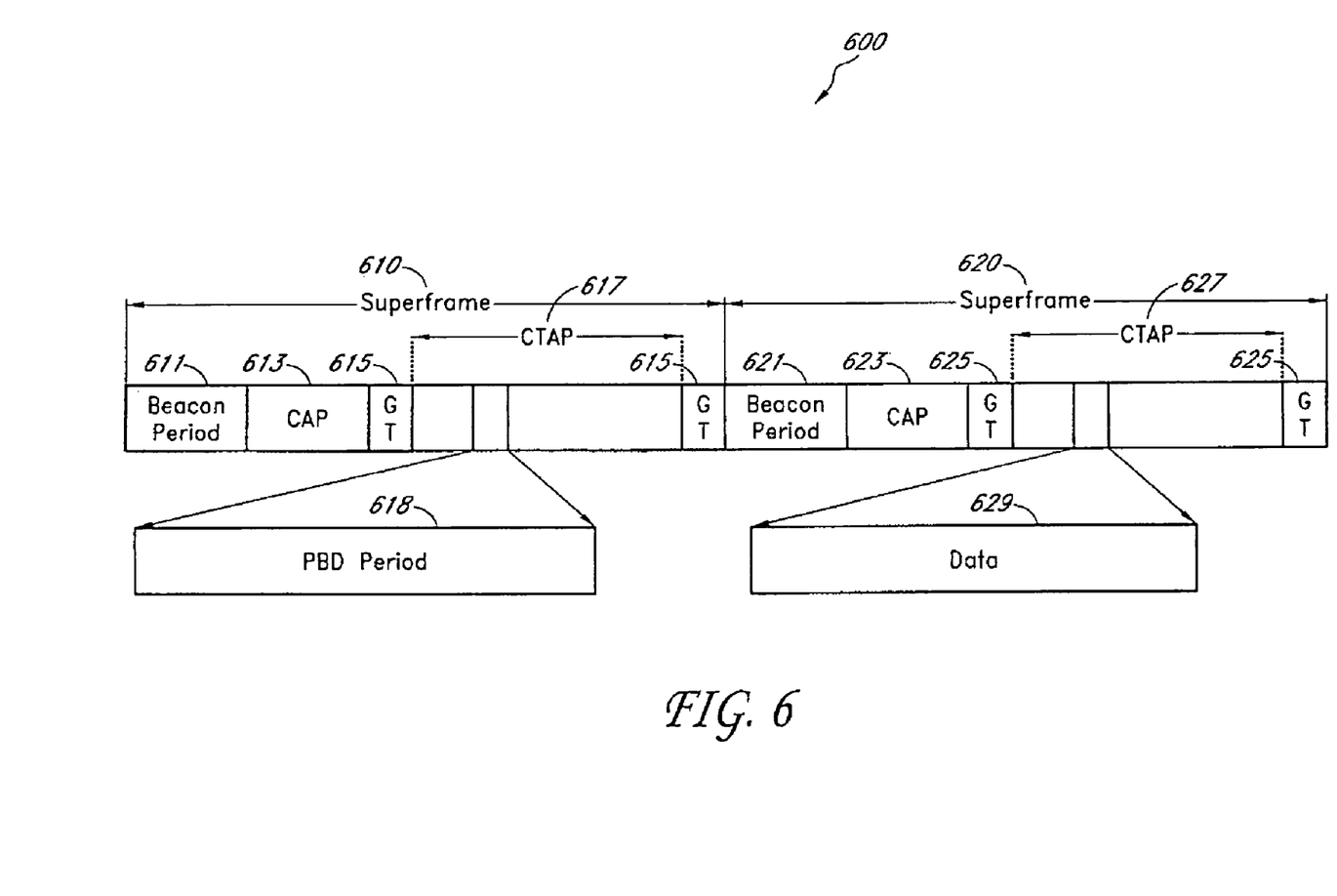
FIG. 6 shows an example superframe structure that can be used in a PBD procedure such as the one illustrated by FIG. 5.

FIG. 6 shows an example superframe structure 600 that can be used in a PBD procedure such as the one illustrated by FIG. 5. The example superframe structure 600 comprises a first superframe 610 followed by a second superframe 620. Each superframe includes a beacon period 611, 621, a contention access period (CAP) 613, 623, channel time access periods (CTAPs) 617, 627, and guard times (GTs) 615, 625. The CTAPs typically occur during contention free time periods and comprise time blocks or period allocated for communications by pairs of transmit and receive stations. In the example shown, the CTAP 617 for the first superframe 610 includes a PBD period 618 allocated for executing the PBD, while the CTAP 627 for the second superframe 620 includes a data period 629 allocated for data transfer. The PBD period 618 and the data period 629 can correspond to the first period allocated for PBD and the second period allocated for data transfer discussed above with respect to FIG. 5, respectively. While the superframe structure 600 is described with respect to the PBD procedure with the two-step bandwidth allocation illustrated by FIG. 5, the superframe structure 600 can apply to the PBD procedure with one-step bandwidth allocation procedure which will be described with respect to FIGS. 8 and 10 below.

Figure 7:
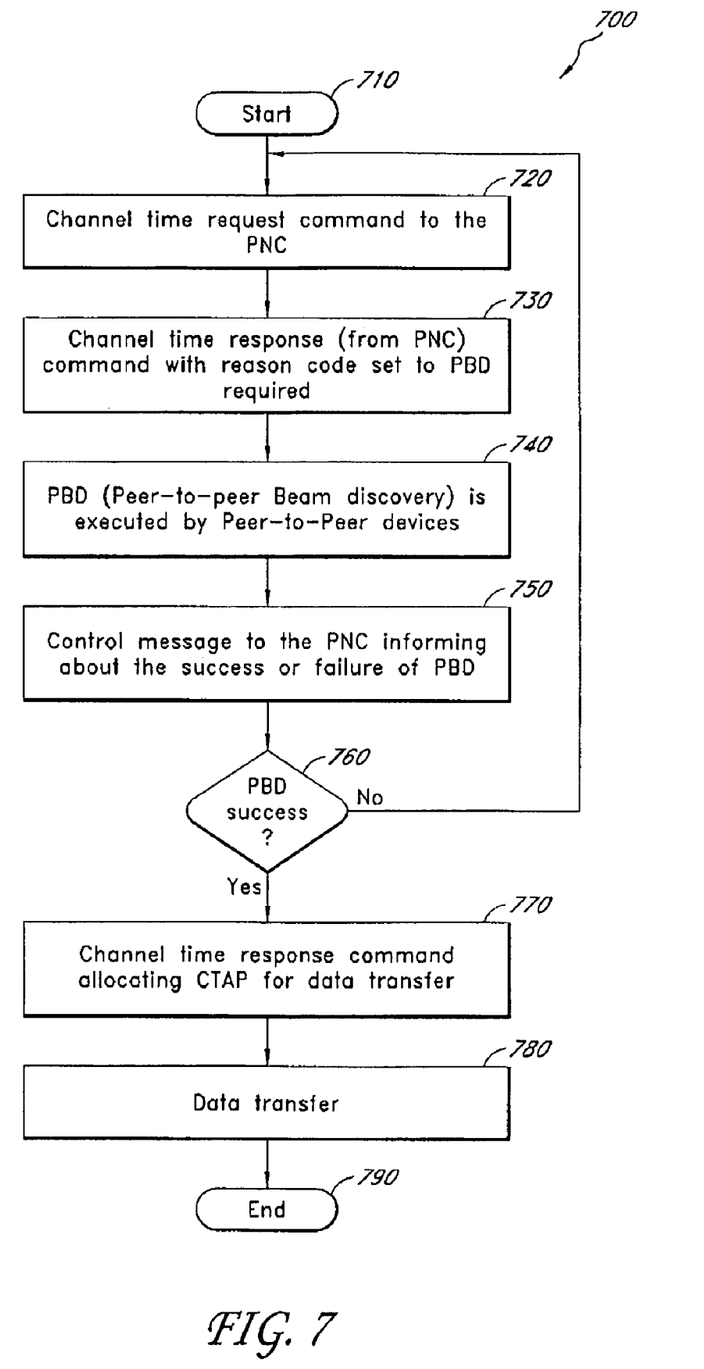
FIG. 7 is a flowchart illustrating an example process for a PBD procedure involving two-step bandwidth allocation such as the one illustrated by FIGS. 5.

FIG. 7 is a flowchart illustrating an example process 700 for a PBD procedure involving two-step bandwidth allocation such as the one illustrated by FIG. 5. The process 700 starts at a start state 710 and proceeds to a state 720, where a channel time request (CTR) command or message (1) is transmitted from a transmit station to a coordinator, e.g., from the STA1 510 to the PNC 530 (FIG. 5). The CTR command (1) indicates to the coordinator (e.g., the PNC) that the transmit station (e.g., the STA1) wishes to engage in data communication with the receive station (e.g., the STA2) and can include a request for allocation of channel time, e.g., one or more time periods, for executing PBD with the receive station. The CTR command (1) can also include MAC address of the receive station. In certain embodiments, the CTR command (1) can specifically make a request for a bandwidth allocation for PBD. The process 700 proceeds to a state 730, where a first channel time response (2) is transmitted from the coordinator to the transmit station. Alternatively, the first channel time response can be transmitted to the receive station, which can relay the response to the transmit station. Assuming that allocation of bandwidth for PBD was successful, the first channel time response (2) includes a first time period allocated for executing the PBD by the P2P stations (e.g., STA1 and STA2).

The process 700 proceeds to a state 740, where the PBD is executed by the P2P stations during the first time period allocated for that purpose. The process 700 proceeds to a state 750, where a control message (4) indicating success or failure of the PBD is transmitted from the transmit station to the coordinator. Alternatively, the control message can come from the receive station rather than from the transmit station. The process 700 proceeds to a decision state 760, where the coordinator determines whether the PBD was successful based on the control message received at the state 750. If the PBD was not successful (No) (e.g., an acceptable SNR was not achieved), the process 700 loops back to the state 720, where another attempt for P2P beam discovery and data transfer begins.

Figure 9:
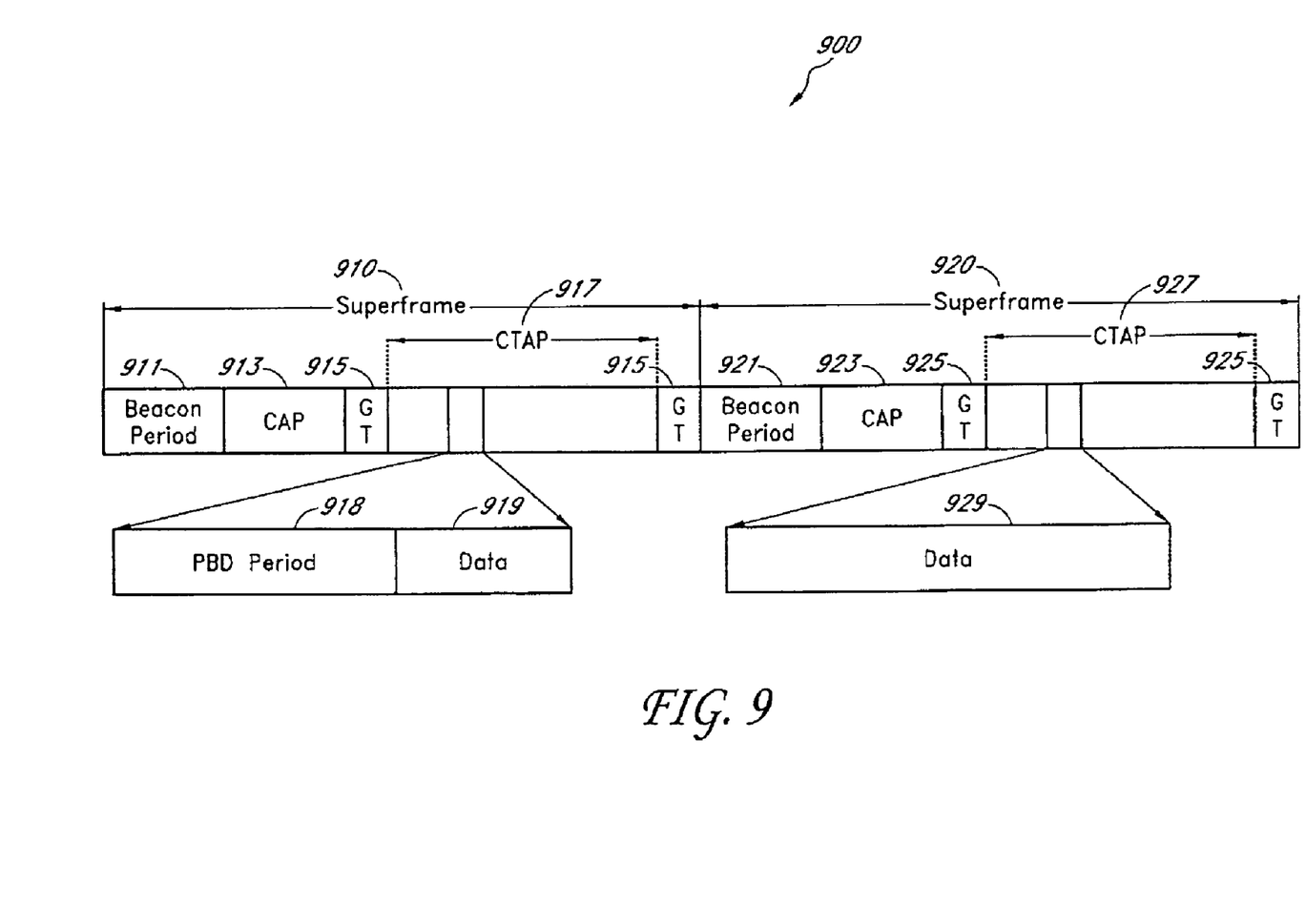
FIG. 9 shows an example superframe structure that can be used in a PBD procedure such as the one illustrated by FIG. 8.

If the PBD was successful (Yes) (e.g., an acceptable SNR was achieved), the process 700 proceeds to a state 770, where a second channel time response (5) indicating a successful allocation of a second time period for data transfer is transmitted from the coordinator to the transmit station. The process 700 proceeds to a state 780, where data transfer takes place between the two stations (e.g., the STA1 510 and the STA2 520) during the second time period. As used herein, each of the first period for PBD and the second period for data transfer can include one CTAP or multiple CTAPs. In some embodiments, the multiple CTAPs for either PBD or data transfer may occur within one superframe. In other embodiments, the multiple CTAPs for the PBD or data transfer may be distributed over multiple superframes. For example, depending on the amount of data transmitted and other data transmissions that are scheduled, the data transfer between the two stations can take place within a single superframe as shown in FIG. 6 or can be distributed over multiple superframes as shown in FIG. 9. The process 700 ends at state 790.

b. One-Step Bandwidth Allocation

In an alternative option or embodiment of the PBD, the PNC performs bandwidth reservation for PBD and data transfer in one step instead of two separate steps as described above with respect to FIGS. 5-7. For example, the PNC allocates the requested time period for data transfer and some additional time period for the PBD in one step and communicates the allocation of two time periods (one for the PBD and another for the data transfer) in one channel time response to the transmit station instead of two channel time responses.

Figure 8:
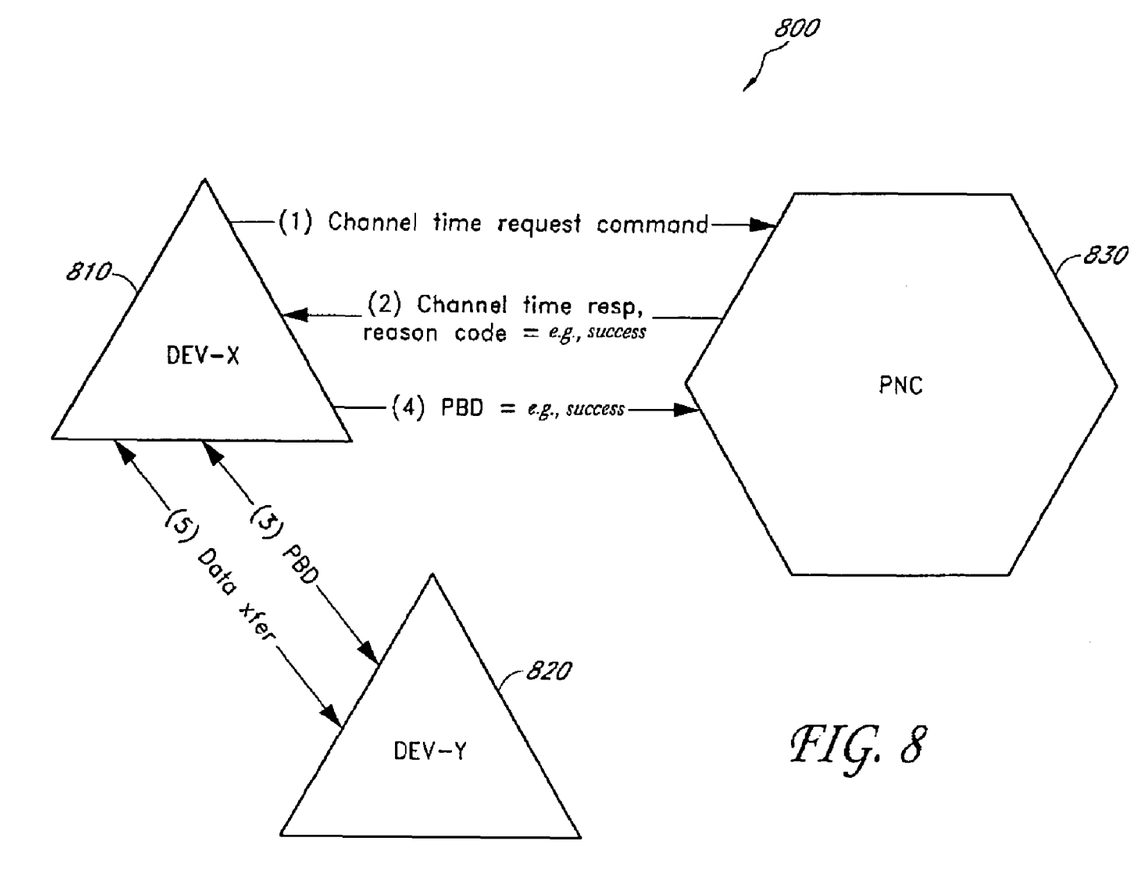
FIG. 8 is a message sequence chart for illustrating an embodiment of a PBD procedure in which the PNC allocates bandwidth for PBD and data transfer in one step.

FIG. 8 is a message sequence chart for illustrating an embodiment of a PBD procedure in which the PNC allocates bandwidth for PBD and data transfer in one step. The message sequence begins when a first station (STAT) 810, e.g., a transmit station, sends or transmits a channel time request (CTR) command (1) to a PNC 830. The CTR command (1) indicates to the PNC 830 that the STA1 810 wishes to engage in data transfer with a second station (STA2) 820, e.g., a receiver or destination station. The CTR command (1) can include a request for allocation of bandwidth, e.g., one or more time periods, for executing the PBD and for data transfer. Upon receiving the CTR command (1), the PNC 830 sends a first channel time response (2) to the STA1 810. In certain embodiments, the first channel time response (2) can include a reason code set to "Success." In other embodiments, the first channel time response (2) can include a reason code set to "PBD required." In certain embodiments, if the requested bandwidth is available and the PBD between the peer stations is valid, the PNC replies with a channel time response command having the reason code field set to Success. On the other hand, if the PBD is not valid at the time the channel is requested, the PNC can set the reason code field set to PBD required.

Before sending the channel time response (2), the PNC 830 reserves or allocates a first time period for executing the PBD and a second time period for engaging in data transfer. The channel time response (2) can include one or more channel time allocation periods (CTAPs) including the first time period and the second time period. In some embodiments, the PNC knows the antenna configurations of the P2P stations, such as the number of antenna sectors at the P2P stations, and the channel on which the P2P stations will execute beam discovery. In those embodiments, the PNC can estimate the time required for the PBD procedure. In other embodiments, the PNC can allocate a nominal time period for PBD, and the P2P stations can request additional period for PDB if so required.

After receiving the channel time response message (2), the STA1 810 executes PBD by exchanging PBD messages (3) with the STA2 820. The PBD messages (3) are exchanged during the first time period allocated for the PBD procedure by the PNC and communicated to the STA1 via the channel time response message (2). Through the exchange of the PBD messages (3), the P2P stations (STA1 and STA2) can discover a beam direction by, for example, finding a combination of antenna sectors that achieves a sufficiently high or highest SNR, to use for subsequent data transfer. In certain embodiments, the STA1 810, the transmit station initiating the channel allocation (e.g., by sending the CTR command to the PNC), is the sender of the PBD messages (3). In other embodiments, the STA2 820, the receive station, is the sender of the PBD messages. The PBD messages (3) can be probes, announce commands, beam searching messages, and the like. After the exchange of PBD messages (3), the STA1 810 sends a control message (4) to the PNC. The control message (4) indicates success or failure of the PBD procedure. In this example, the success means the P2P stations were able to discover a pair of antenna sectors that could achieve an acceptable signal-to-noise ratio (SNR). The failure, on the other hand, means the P2P stations, for various reasons, were unable to find a pair of antenna sectors that could achieve an acceptable SNR. In the example shown, the control message (4) indicting the success or failure of the PBD is sent by the STA1 810, the transmit station. In other embodiments, the control message (4) can be sent by the STA2 820, the receive station.

If the PBD was successful, the STA1 810 starts transmitting data to the STA 2 820 during the second time period already allocated by the PNC and provided to the STA1 via the channel time response message (2). Note that unlike the first PBD embodiment with the two-step bandwidth allocation discussed above, this second PBD embodiment with the one-step bandwidth allocation does not require a separate second channel time response from the PNC indicating allocation of the second time period for data transfer. This is because in the second PBD embodiment, the allocation of the second time period for data transfer is performed at the same time as the allocation of the first time period for PBD and both allocations are communicated to the STA1 810 via the first channel time response (2).

If the PBD failed, on the other hand, the STA1 810 backs off and retries for another PBD or terminates its attempt to send data during the allocated second time period. In certain embodiments, the STA1 810 also has the responsibility to cancel the allocated bandwidth for data transfer, e.g., the second time period, to avoid waste of the already-allocated bandwidth which will not be used. For example, the STA1

810 can send a message indicating a failure of the PBD (e.g., PBD with status=failure) to the PNC 830 each time the attempt fails. After a number of repeated attempts, if the PBD still fails, the PNC cancels the allocated data period.

FIG. 9 shows an example superframe structure 900 that can be used in a PBD procedure such as the one illustrated by FIG. 8. The example superframe structure 900 comprises a first superframe 910 followed by a second superframe 920. Each superframe includes a beacon period 911, 921, a contention access period (CAP) 913, 923, channel time access periods (CTAPs) 917, 927, and guard times (GTs) 915, 925. The CTAPs typically occur during contention free time periods and comprise time blocks or periods allocated for communications by pairs of transmit and receive stations. In the example shown, the CTAP 917 for the first superframe 910 includes a PBD period 918 allocated for PBD and a first data period 919 for data transfer, while the CTAP 927 for the second superframe 920 includes a second data period 929 for additional data transfer. The PBD period 918 and the first and second data periods 919, 929 can correspond to the first period allocated for PBD and the second period allocated for data transfer, respectively, discussed above with respect to FIG. 8. In the example shown, the PBD period 918 and the first data period 919 are contiguous. In other embodiments, they are not contiguous, but separated by one or more CTAPs allocated for communications involving other transmit and receive stations. In yet other embodiments, the first data period 919 occurs within the CTAP 927 for the second superframe 920 along with the second data period 929. While the superframe structure 900 is described with respect to the PBD procedure with the one-step bandwidth allocation illustrated by FIG. 8, the superframe structure 900 can apply to the PBD procedure with two-step bandwidth allocation procedure described with respect to FIGS. 5 and 7 above.

Figure 10:
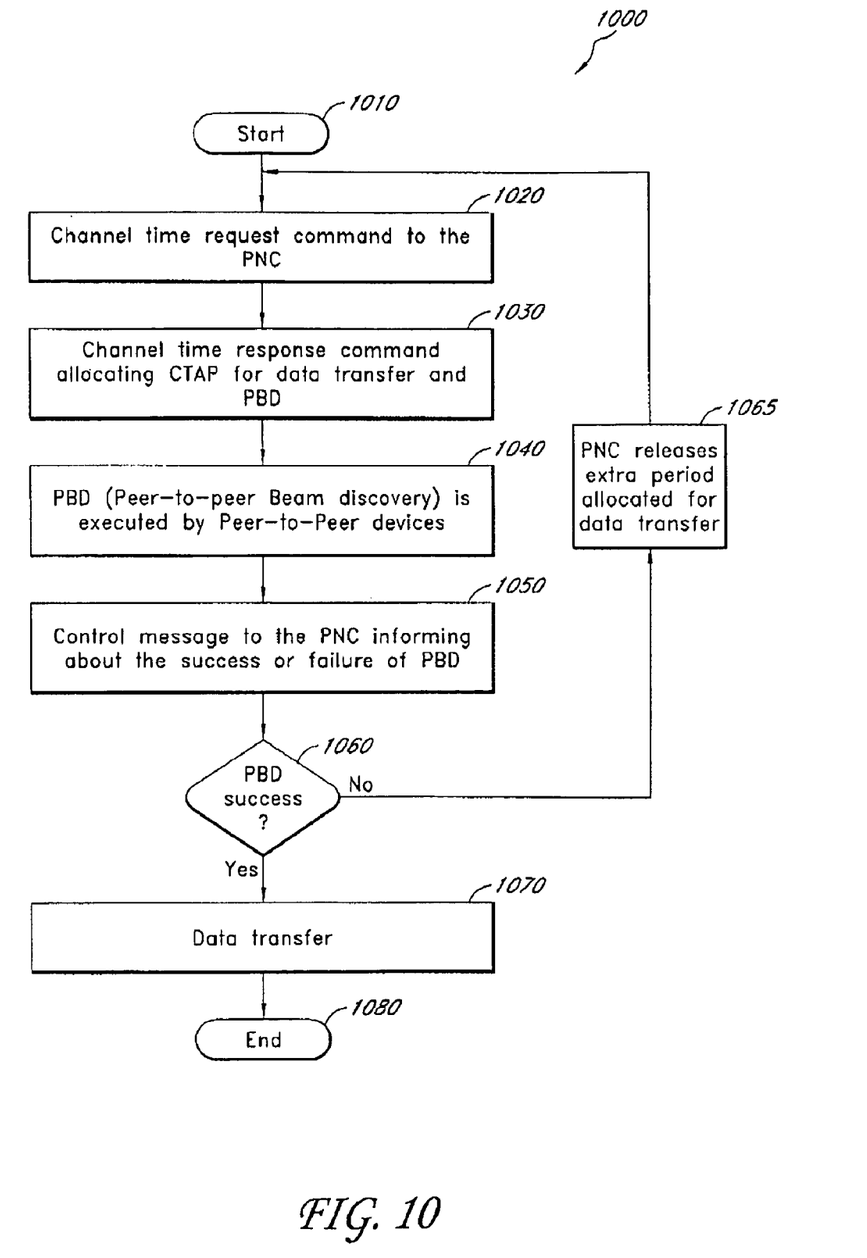
FIG. 10 is a flowchart illustrating an example process for a PBD procedure involving one-step bandwidth allocation such as the one illustrated by FIG. 8.

FIG. 10 is a flowchart illustrating an example process 1000 for a PBD procedure involving one-step bandwidth allocation such as the one illustrated by FIG. 8. The process 1000 starts at a start state 1010 and proceeds to a state 1020, where a channel time request (CTR) command or message (1) is transmitted from a transmit station to a coordinator, e.g., from the STA1 810 to the PNC 830 (FIG. 8). The CTR command (1) indicates to the coordinator (e.g., the PNC) that the transmit station (e.g., the STA1) wishes to engage in data communication with the receive station (e.g., the STA2) and can include a request for allocation of channel time, e.g., one or more time periods, for executing PBD and data transfer with the receive station. The CTR command (1) can also includes MAC address of the receive station. In certain embodiments, the CTR command (1) can specifically make a request for a bandwidth allocation for PBD. After receiving the CTR command (1), the coordinator allocates bandwidth, e.g., a first time period for PBD (PBD period) and a second time period for data transfer (data period). The process 1000 proceeds to a state 1030, where a channel time response (2) is transmitted from the coordinator to the transmit station. Alternatively, the channel time response can be transmitted to the receive station, which can relay the response to the transmit station. Assuming that the allocation was successful, the channel time response (2) includes both the PBD time period and the data time period.

The process 1000 proceeds to a state 1040, where the PBD is executed by the P2P stations during the PBD time period allocated for that purpose. The process 1000 proceeds to a state 1050, where a control message (4) indicating success or failure of the PBD is transmitted from the transmit station to the coordinator. Alternatively, the control message can come from the receive station rather than from the transmit station. The process 1000 proceeds to a decision state 1060, where the coordinator determines whether the PBD was successful based on the control message received at the state 1050. If the PBD was not successful (No) (e.g., an acceptable SNR was not achieved), the process 1000 advances to a state 1065 where the PNC releases extra time periods allocated for data transfer and then loops back to the state 1020 where another attempt for P2P beam discovery and data transfer begins.

If the PBD was successful (Yes) (e.g., a sufficiently high SNR was achieved), the process 1000 proceeds to a state 1070, where data transfer takes place between the P2P stations (e.g., the STA1 810 and the STA2 820) during the data time period. As used herein, each of the PBD period for PBD and the data period for data transfer can include one CTAP or multiple CTAPs. In some embodiments, the multiple CTAPs for either PBD or data transfer may occur within one superframe. In other embodiments, the multiple CTAPs for the PBD or data transfer may be distributed over multiple superframes. For example, depending on the amount of data transmitted and other data transmissions that had to be scheduled, the data transfer between the P2P stations can take place within a single superframe as shown in FIG. 6 or can be distributed over multiple superframes as shown in FIG. 9. The process 1000 ends at state 1080.

The above-described method of peer-to-peer beam discovery (PBD) may be realized in a program format to be stored on a computer readable recording medium that includes any kinds of recording devices for storing computer readable data, for example, a CD-ROM, a DVD, a magnetic tape, a memory (e.g., capable of storing firmware), memory card and a disk, and may also be realized in a carrier wave format (e.g., Internet transmission or Bluetooth transmission). In some embodiments, the transmitter 202 or the receiver 204 shown in FIG. 2 includes the computer readable recording medium and can also include a processor, controller, or other computing device, Conclusion While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A method of performing a beam discovery between peer stations in a wireless network, the method comprising:
   receiving a channel time message indicating an allocation of a first time period for a peer-to-peer beam discovery (PBD), wherein the PBD is configured to discover a beam direction to be used for data transfer to a peer station;
   executing the PBD between two peer stations during the first time period;
   transferring data to the peer station via the discovered beam direction if the PBD is successful; and
   storing a PBD status value associated with the two peer stations.

2. The method of claim 1, wherein the PBD includes finding one or more antenna sectors that yield a signal-to-noise ratio (SNR) that is equal to or greater than a threshold SNR value.

3. The method of claim 1, wherein the PBD includes finding one or more beamforming vectors that yield a signal-to-noise ratio (SNR) that is equal to or greater than a threshold SNR value.

4. The method of claim 1, wherein the PBD includes finding a beam direction that yields the highest signal-to-noise ratio (SNR) among a plurality of beam directions that yield SNRs that are equal to greater than a threshold SNR value.

5. The method of claim 1, wherein the channel time message is sent in response to a transmission of a channel time request to a coordinator.

6. The method of claim 5, wherein the channel time request makes a request for an allocation of channel time for the PBD, but not another allocation for the data transfer.

7. The method of claim 5, wherein the channel time request makes a request for an allocation of channel time for both the PBD and the data transfer.

8. The method of claim 1, wherein the channel time message further indicates an allocation of a second time period for the data transfer.

9. The method of claim 1, wherein the first time period comprises one or more channel time allocation periods (CTAPs) allocated for the PBD.

10. The method of claim 9, wherein the one or more CTAPs allocated for the PBD are contained within one superframe.

11. The method of claim 9, wherein the one or more CTAPs allocated for the PBD are distributed over a plurality of superframes.

12. The method of claim 1, further comprising transmitting a control message to a coordinator indicating success or failure of the PBD.

13. The method of claim 1, wherein the PBD status value is stored in a PBD status matrix.

14. The method of claim 13, wherein the PBD status value indicates whether a PBD between two peer stations is valid.

15. A method of facilitating a beam discovery between peer stations in a wireless network, the method comprising:
   allocating a first time period for a peer-to-peer beam discovery (PBD), wherein the PBD is configured to discover a beam direction to be used for data transfer between a first station and a second station;
   transmitting a channel time message indicating an allocation of the first time period to at least one of the first and second stations;
   receiving a control message from at least one of the first and second stations indicating success or failure of the PBD; and
   storing a PBD status matrix including a PBD status value.

16. The method of claim 15, further comprising receiving a channel time request from one of the first and second stations.

17. The method of claim 16, wherein the channel time request makes a request for an allocation of channel for the PBD, but not for the data transfer.

18. The method of claim 16, wherein the channel time request makes a request for an allocation of channel time for both the PBD and data transfer.

19. The method of claim 15, further comprising transmitting a second channel time message indicating an allocation of a second time period for the data transfer.

20. The method of claim 15, wherein the channel time message further indicates an allocation of a second time period for the data transfer.

21. The method of claim 20, further comprising releasing the second time period allocated for the data transfer if the PBD fails.

22. The method of claim 15, further comprising estimating a total length of the first time period for the PBD based at least in part on the number of antenna sectors or elements at the first and second stations.

23. A communication apparatus for performing a beam discovery with a peer station in a wireless network, the apparatus comprising:
   a processor configured to:
      receive a channel time message indicating an allocation of a first time period for a peer-to-peer beam discovery (PBD), wherein the PBD is configured to discover a beam direction to be used for data transfer to a peer station, and
      execute the PBD during the first time period;
   a directional antenna configured to transfer data to the peer station via the beam direction discovered by the PBD; and
   a memory configured to:
      store a PBD status matrix including a PBD status value.

24. The apparatus of claim 23, wherein the processor is further configured to transmit a channel time request to a coordinator.

25. The apparatus of claim 24, wherein the channel time request makes a request for an allocation of channel time for the PBD, but not for the data transfer.

26. The apparatus of claim 24, wherein the channel time request makes a request for an allocation of channel time for both the PBD and the data transfer.

27. The apparatus of claim 24, wherein the processor is further configured to transmit a control message to the coordinator indicating success or failure of the PBD.

28. The apparatus of claim 24, wherein the directional antenna includes one of a switched antenna and a phased array antenna.

29. A communication apparatus for facilitating a beam discovery in a wireless network, the apparatus comprising a processor configured to:
   allocate a first time period for a peer-to-peer beam discovery (PBD), wherein the PBD is configured to discover a beam direction to be used for data transfer between a first station and a second station;
   transmit a channel time message indicating an allocation of a first time period for the PBD to at least one of the first and second stations;
   receive a control message from at least one of the first and second stations indicating success or failure of the PBD; and
   a memory configured to:
      store a PBD status matrix, wherein the PBD status matrix includes a PBD status value.

30. The apparatus of claim 29, wherein the PBD status value indicates whether a PBD between two peer stations is valid.

31. The apparatus of claim 30, wherein a PBD status value between station i and station j is stored in a non-diagonal (i, j) entry of the PBD status matrix.

32. The apparatus of claim 30, wherein the PBD status value is true or false.

33. The apparatus of claim 29, wherein the processor is further configured to estimate a total length of the first time period for the PBD based at least in part on the number of antenna sectors or antenna elements at the first and second stations.

34. The apparatus of claim 29, wherein the processor is further configured to allocate a second time period for the data transfer after receiving the control message.

35. The apparatus of claim 29, wherein the processor is further configured to allocate a second time period before receiving the control message.

36. The apparatus of claim 29, wherein the communications apparatus is a piconet controller (PNC) in a wireless personal area network (WPAN).

\* \* \* \* \*